Oct. 21, 1924.                                          1,512,854
C. F. MARSTON
OPERATING MEANS FOR REAR END VEHICLE SIGNALS
Filed July 29, 1920
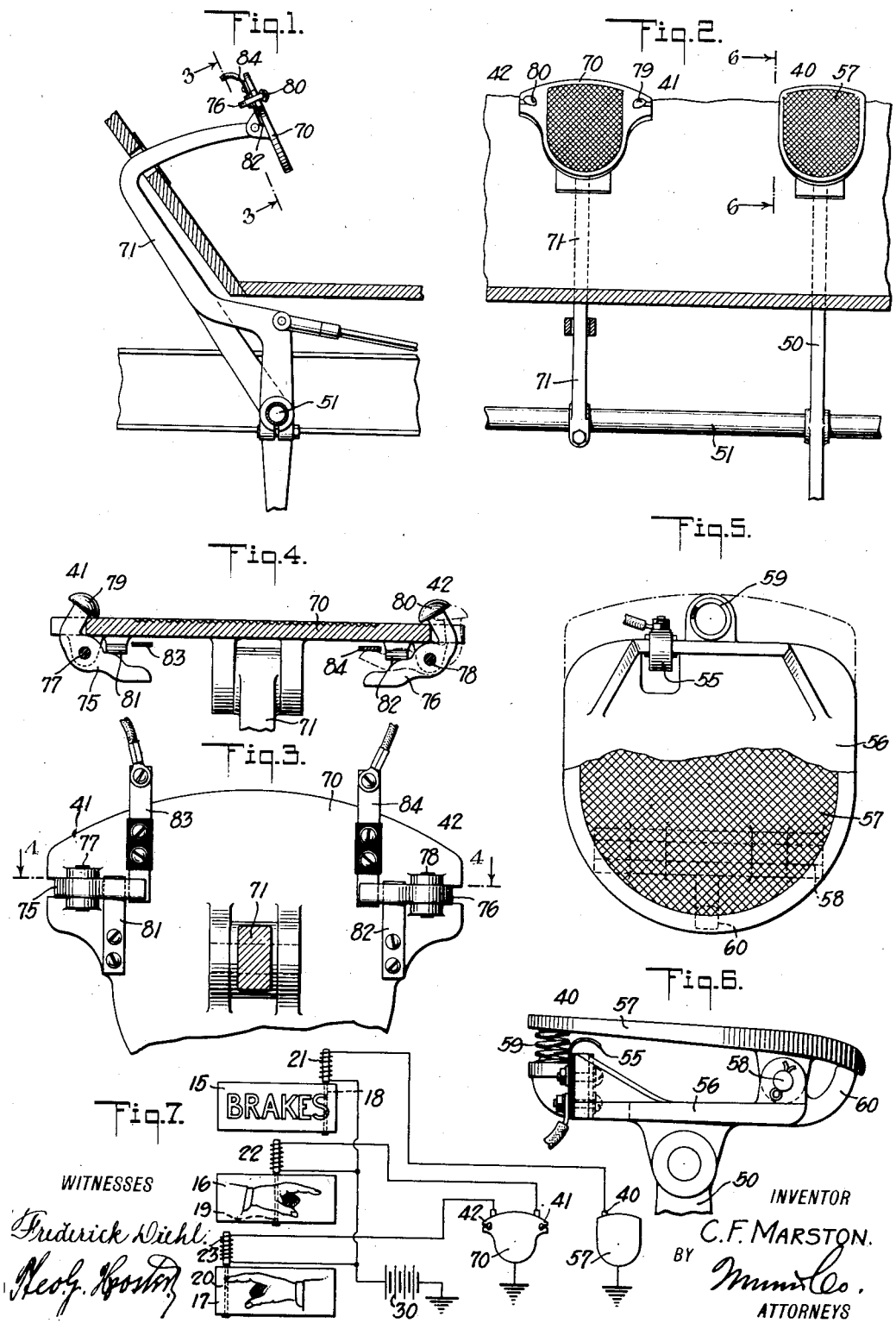
INVENTOR
C. F. MARSTON.

Patented Oct. 21, 1924.

1,512,854

UNITED STATES PATENT OFFICE.

CHARLES F. MARSTON, OF BROOKLYN, NEW YORK, ASSIGNOR TO AUTO-AUTOMATIC SIGNAL CO., INC., A CORPORATION OF NEW YORK.

OPERATING MEANS FOR REAR-END VEHICLE SIGNALS.

Application filed July 29, 1920. Serial No. 399,664.

*To all whom it may concern:*

Be it known that I, CHARLES F. MARSTON, a citizen of the United States, and a resident of the city of New York, borough of Brooklyn, in the county of Kings and State of New York, have invented a new and Improved Operating Means for Rear-End Vehicle Signals, of which the following is a full, clear, and exact description.

The invention relates to rear end signals for vehicles, such as shown and described, for instance, in the application for Letters Patent of the United States, Serial No. 385,517, filed by me on June 1, 1920.

The object of the present invention is to provide a new and improved operating means for rear end signals for automobiles and other vehicles arranged to enable the operator in charge of the vehicle to readily display a danger signal when applying the brakes, or a turn-out signal when turning out to the right or to the left, the brake or stop signal being controlled from the brake lever pedal while the turn-out signals are controlled from the clutch pedal and wholly independent of the brake lever pedal.

Another object is to permit of readily actuating a clutch lever for throwing out the clutch without affecting the turn-out signals or the brake and stop signal.

With these and other objects in view, the invention consists of certain novel features of construction as hereinafter shown and described and then specifically pointed out in the claim.

A practical embodiment of the invention is represented in the accompanying drawings forming a part of this specification, in which similar characters of reference indicate corresponding parts in all the views.

Figure 1 is a fragmentary sectional side elevation of an automobile provided with the improved operating means for the rear end signals;

Figure 2 is a rear elevation of the same with the car floor shown in section;

Figure 3 is an enlarged under face view of the pedal on the clutch lever and with the latter shown in section on the line 3—3 of Figure 1;

Figure 4 is a sectional plan view of the same on the line 4—4 of Figure 3;

Figure 5 is an enlarged front face view of the brake lever pedal with part broken out;

Figure 6 is a side elevation of the same; and

Figure 7 is a diagrammatic view of the electric connections between the pedals and the electromagnetic devices controlling the direction indicating members of the rear end signal.

In my application above referred to use is made of indicating members 15, 16 and 17, preferably in the form of thin plates provided with words, arrows, pointing fingers or other indicating means to be seen by the driver of a following vehicle or by a pedestrian or other person whenever such indicating member is lifted into display position. In practice and as shown in Figure 7, the plate 15 is provided with the word "Brakes," the plate 16 is provided with a hand pointing to the right, and the plate 17 is provided with a similar hand but pointing to the left. When the indicating member 15 is moved into display position the word "Brakes" appears, thus indicating to the following vehicle that it is the intention to slow up or come to a stop; when the indicating member 16 is raised into display position it indicates to a following vehicle the intention of turning out to the right; and when the indicating member 17 is raised into display position it indicates to a following vehicle the intention of turning out to the left. The indicating members 15, 16 and 17 are directly attached to the cores 18, 19 and 20 of solenoids 21, 22 and 23, which when energized lift the indicating members 15, 16 and 17 into the display position above mentioned.

The solenoids 21, 22 and 23 are connected with a suitable source of electrical energy 30, and the circuits are provided with switches 40, 41 and 42 under the control of the operator in charge of the vehicle to enable said operator to close the normally open switch for any one of the solenoids 21, 22 and 23 with a view to energize the same and cause the corresponding indicating member 15, 16 and 17 to be lifted into display position, thus giving the desired signal to the driver of the following vehicle. When the closed switch is opened by the operator then the corresponding solenoid 21, 22 or 23 is de-energized and hence its core 18, 19 or 20 and with it the corresponding indicating member 15, 16 or 17 drops downward into its normal position of rest.

The switch 40 is mounted on and forms part of the foot controlled brake lever 50 mounted to swing on the shaft 51 as a fulcrum, and the said brake lever controls the brake of the automobile or other power driven vehicle in the usual manner. The switch contact 40 comprises a spring contact 55 held insulated on a base plate 56 attached to the upper end of the brake lever 50. The contact 55 is adapted to be engaged by a contact formed by a foot plate 57 pivoted at 58 on the base plate 56 and held normally in uppermost position by a spring 59 interposed between the foot plate 57 and the base plate 56. A stop lug 60 fixed on the base plate 56 limits the upward swinging movement of the foot plate 57. It will be noticed that normally the switch 40 is open but when the operator bears down on the foot plate 57 with a view to swing the brake lever into braking position then the foot plate 57 moves into engagement with the fixed contact 55 thus closing the switch 40 and thereby energizing the solenoid 21 to lift the indicating member 15 into display position. Thus whenever the operator applies the brakes the indicating member denoting "Brakes" is moved into display position. As soon as the operator releases the pressure on the foot plate 57 the latter returns to normal uppermost position by the action of its spring 59 thereby moving out of engagement with the contact 55 and thereby breaking the circuit for the solenoid 21.

The switches 41 and 42 are mounted on the right and left-hand sides of a foot plate 70 held on the upper end of the clutch lever 71 secured to the clutch shaft 51 above mentioned and serving for throwing out the clutch to disconnect the motor from the driving gear. The switches 41 and 42 comprise switch levers 75, 76 fulcrumed at 77 and 78 on the under side of the foot plate 70, and the upper ends of the said levers are provided with buttons or foot pads 79 and 80 projecting beyond the face of the foot plate 70 to be within convenient reach of the operator's foot. The levers 75 and 76 are pressed on by springs 81, 82 to normally hold the said levers out of engagement with spring contacts 83, 84 held insulated on the under side of the foot plate 70. The contacts 83 and 84 are electrically connected with the solenoids 22 and 23, and the foot plates 57, 70 are grounded as indicated in the diagram in Figure 7. It will be noticed that when the operator in charge of the power driven vehicle presses the button or foot pad 79 the switch 41 for the solenoid 22 is closed and hence the latter is energized and the indicating member 16 moves into display position, and when the button or foot pad 79 is released the solenoid 22 becomes de-energized and the indicating member 16 returns to a position of rest. When the button or foot pad 80 is pressed the switch 42 for the solenoid 23 is closed and hence the indicating member 17 moves into display position, and when the said button or foot pad is released the switch 42 is opened and the indicating member 17 returns to a position of rest.

From the foregoing it will be seen that the brake indicating member 15 moves into display position whenever the operator begins to apply the brakes owing to the foot plate 57 forming part of the brake lever 50 and part of the switch 40. Either of the switches 41 or 42 can be actuated whenever it is desired to turn out to the right or to the left and at the same time that the operator actuates the clutch lever 71 for throwing out the motor shaft clutch, as is usually done in making a turn out to the right or to the left. Thus the turn-out signals are not liable to be affected when the brake signal is moved to display position and vice versa, thus preventing wrong display of any one of the signals.

Having thus described my invention, I claim as new and desire to secure by Letters Patent:—

In a signal operating means, a base plate having a laterally extending stop formed at one end thereof, a foot plate pivoted to said base plate adjacent said end and having its opposite end spaced from said base plate, the end of said foot plate adjacent its pivot being engageable with said stop to limit the movement of the opposite end of said foot plate away from said base plate, a contact carried by said base plate and extending transversely with respect thereto and projecting into the space between said base and foot plates to a point adjacent the latter plate, and means interposed between said plates and serving to normally retain the foot plate out of engagement with said contact.

CHARLES F. MARSTON.